United States Patent [19]

Hadley

[11] Patent Number: 4,530,877
[45] Date of Patent: Jul. 23, 1985

[54] FIRE RESISTANT FOAM INSULATED BUILDING PANELS

[75] Inventor: John F. Hadley, Bradford Woods, Pa.

[73] Assignee: Cyclops Corporation, Pittsburgh, Pa.

[21] Appl. No.: 454,430

[22] Filed: Dec. 29, 1982

Related U.S. Application Data

[63] Continuation-in-part of Ser. No. 313,723, Oct. 22, 1981, abandoned.

[51] Int. Cl.³ .................. B32B 9/00; B32B 33/00
[52] U.S. Cl. .................. 428/305.5; 428/316.6; 428/319.1; 428/920; 428/921
[58] Field of Search .......... 428/304.4, 305.5, 314.4, 428/314.8, 316.6, 317.1, 317.3, 317.5, 317.7, 318.4, 318.6, 319.1, 319.3, 319.7, 920, 921

[56] References Cited

U.S. PATENT DOCUMENTS

| | | | |
|---|---|---|---|
| 3,709,733 | 1/1973 | Mautner | 428/316.6 |
| 3,934,066 | 1/1976 | Murch | 428/921 |
| 4,015,386 | 4/1977 | Cook | 428/921 |
| 4,058,643 | 11/1977 | Marshall et al. | 428/198 |
| 4,085,247 | 4/1978 | Godfried | 428/319.1 |
| 4,122,203 | 10/1978 | Stahl | 428/318.4 |

FOREIGN PATENT DOCUMENTS 1084503   9/1967   United Kingdom ............ 428/319.1

OTHER PUBLICATIONS

Therm-A-Frame Brochure, Cyclops, E. G. Smith Div., pp. 1-5.
Ball Chemical Data Sheet 7011-2 (no date).
Ball Chemical Data Sheet 7112-1 (no date).
Smith Construction Products Metal Wall & Roof Systems Catalogue, Cyclops, E. G. Smith Div. (no date).

*Primary Examiner*—William J. Van Balen
*Attorney, Agent, or Firm*—Buell, Ziesenheim, Beck & Alstadt

[57] ABSTRACT

The specification discloses a fire resistant foam insulated building panel comprised of two skins having a cellular plastic core between them and a fire resistant coating on the interior face of at least one skin. The fire resistant coating is comprised of a film-forming organic polymer having solid, reactive ingredients distributed therethrough which will react when exposed to heat to release nonflammable gases. The gases are entrapped in the film causing it to expand into an insulating barrier up to one hundred times thicker than the original coating.

12 Claims, 2 Drawing Figures

FIRE RESISTANT FOAM INSULATED BUILDING PANELS

This is a continuation-in-part of my application Ser. No. 313,723 filed 10-22-81 now abandoned.

The invention relates to building panels having rigid faces and a fire sensitive, cellular plastic filler such as polurethane foam.

Foam insulated building panels are currently being used for both interior and exterior walls. They are strong, lightweight and energy efficient. A two-inch thick panel having steel skins and a polyurethane foam core has an R-factor of 16 and will withstand winds of over 65 mph. Nevertheless, many builders have refused to use foam panels because the structures are not fire resistant. When exposed to flame the skins buckle and the core burns and emits smoke.

Stahl in U.S. Pat. No. 4,122,203 attempted to improve the fire resistance of a foam insulated panel by providing a thermal barrier between the panel skin and the foam core. He discloses a coating approximately one-eighth inch thick comprised of sprayable synthetic resinous material having an organic salt of a Group II A element dispersed therethrough. Application of heat causes the salts to release their water of crystallization thereby cooling the barrier.

Cook in U.S. Pat. No. 4,015,386 utilizes a one-eighth to one-fourth inch thick layer of a hydrous sodium silicate composition between the foam core and outer wall of a door to improve its fire rating. As in Stahl's panel, application of heat causes the release of waters of hydration to cool the layer.

The fire retardant layers of Stahl and Cook suffer several disadvantages. First, they are relatively thick having a thickness equal to or greater than the skins of the panels. Thus, the fire resistant panel is substantially heavier than a fire sensitive panel. Second, they must be vented to permit the escape of water vapor when heat is applied. Vents detract from the appearance of the panel. Third, the thermal barrier of Cook, and to a lesser degree Stahl, is brittle and glassy. Cook, therefore, recommends fibrous reinforcement to protect against impact damage.

I have discovered a foam insulated panel structure which when exposed to fire will produce low smoke and is slow to burn. Thus, a fire in a structure built with my foam panel will be slow to spread and structural damage will be limited.

My foam insulated panel is easy to manufacture and possesses all of the advantages of the foam insulated building panels of the prior art. It is lightweight, durable and can be made in a variety of sizes and colors. Yet, the fire resistance of my panel is substantially greater than the fire resistance of prior art foam insulated building panel structures. Additionally, my panel can be made using existing production techniques and equipment.

I provide a foam insulated building panel having rigid skins and a cellular plastic core. The interior surface of at least one skin is coated with a thin fire resistant coating. The coating is comprised of a mixture of solid, reactive chemical ingredients distributed through a film-forming organic polymer.

When activated by the heat of a fire, the ingredients react chemically to produce thick, insulating layers. The resulting rigid cellular mass, which has the character of a carbonaceous frothy layer, reaches a thickness up to 100 or more times greater than the original dry film. The film-forming polymer, having served its purpose as a carrier and binder, now forms a thin layer over the foam, serving to entrap the volatile reaction products and increase the effectiveness of the cellular mass.

Although several film-forming organic polymers could be used in the coating I prefer to use a halogenated, oil modified polyester resin produced by the co-esterification of a chlorinated polybasic acid or acid anhydride, such as chlorinated phthalic anhydride; selected polyhydric alcohols such as glycerol and/or pentaerythritol, and the fatty acids of a drying or semi-drying oil such as linseed oil or soyabean oil. Such a polymer, dissolved in a suitable solvent, constitutes the carrier and binder for solid, reactive ingredients.

The reactive ingredients are a carbon source, a nitrogenous compound, a chlorine source or brominated organic compound and a polyphosphate. I prefer to use dipentaerythritol for the carbon source. Melamine can be used as the nitrogenous compound. It serves as a blowing agent which releases nonflammable nitrogenous gases, including ammonia. I use a chlorinated aliphatic hydrocarbon, commonly characterized as chlorinated paraffin which serves as both another source of carbon and as a generator of some chlorine-containing, fire-snuffing gas. One could substitute a brominated organic compound for the chlorinated paraffin. Finally, I prefer to use ammonium polyphosphate which functions as a catalyst and a froth inducer.

Ball Chemical Company's instumescent fire retardant paint G-3230 contains the above-described film-forming polymers and solid reactive organic ingredients. I have found this product to be very satisfactory for my panel.

The fire resistant coating is applied to the interior face of at least one skin. The skins are assembled and the foam core is created in conventional manner. As a result there will be a bond between the protective layer and both the skin on one side and the foam core on the other side. This bond will remain during and after heat induced expansion of the coating. Thus, the panel will remain intact during and after a fire.

I prefer to coat the skins with a thermoset epoxy primer to improve the bonding between the skin and the fire resistant coating. Then the fire resistant coating is applied over the primer.

I further prefer to use G-90 galvanized steel for the skins. However, stainless steel, aluminum, melamine laminate and other plastic laminates may be used.

For the core material I am presently using rigid polyurethane foam, employing the inherent adhesive qualities of such foam to develop a bond to the primer/fire retardant coating combinations. My invention would similarly function with any present or future "State-Of-The-Art" foam system.

Other details, objects and advantages of the invention will become apparent as a description of a present preferred embodiment of the invention proceeds.

BRIEF DESCRIPTION OF THE DRAWINGS

In the accompanying drawings I have shown a present preferred embodiment of the invention in which:

Referring to FIG. 1 my foamed panel is typically comprised of two substantially parallel skins 2 and 4 having a cellular plastic core 6 between them. I prefer to use gauge 20, 22 or 24 galvanized ASTM A-446 grade A steel for the skins. However, other grades of steel may be used and aluminum, stainless steel and plastic laminates (such as Formica) will work. For the core I use rigid, class 1 polyurethane foam; but other cores such as isocyanurate, polystyrene and polyurea could be used. I prefer to coat both sides of skins 2 and 4 with a thermoset epoxy primer 10 which protects the skins against corrosion and acts as an adhesive to attach the core 6 to the interior surfaces of the skins. Then I apply my fire resistant coating 8 to the interior surface of at least one of the skins 2 and 4. If only one skin is coated that side should face the interior of the structure.

The metal skin 2 is coated with a primer 10 on both sides providing a primer coat of approximately three tenths of a mil (0.003 inches) thick when dry. My fire resistant coating 8 is applied on top of the interior primer coating 10. If desired the fire resistant coating could be applied before the primer or without the primer. The face coated with the fire resistant coating 8 would be adjacent to the core 6 in an assembled panel. FIG. 1 has been sectioned to show the various coatings. Both the primer and fire resistant coating can be applied by roller coating. The user should follow the primer manaufacturer's instruction as to the thickness of the primer. The fire resistant coating should be applied at a rate of 10 to 40 grams per square foot which produces a dry coating of 7 to 10 mils.

The exterior of the skins can be painted with any wall paint suitable for the environment in which the panel will be used. Should one desire additional fire protection he may apply any fire resistant coating or a fire resistant intumescent coating to the exterior of the panel.

Figure 1:
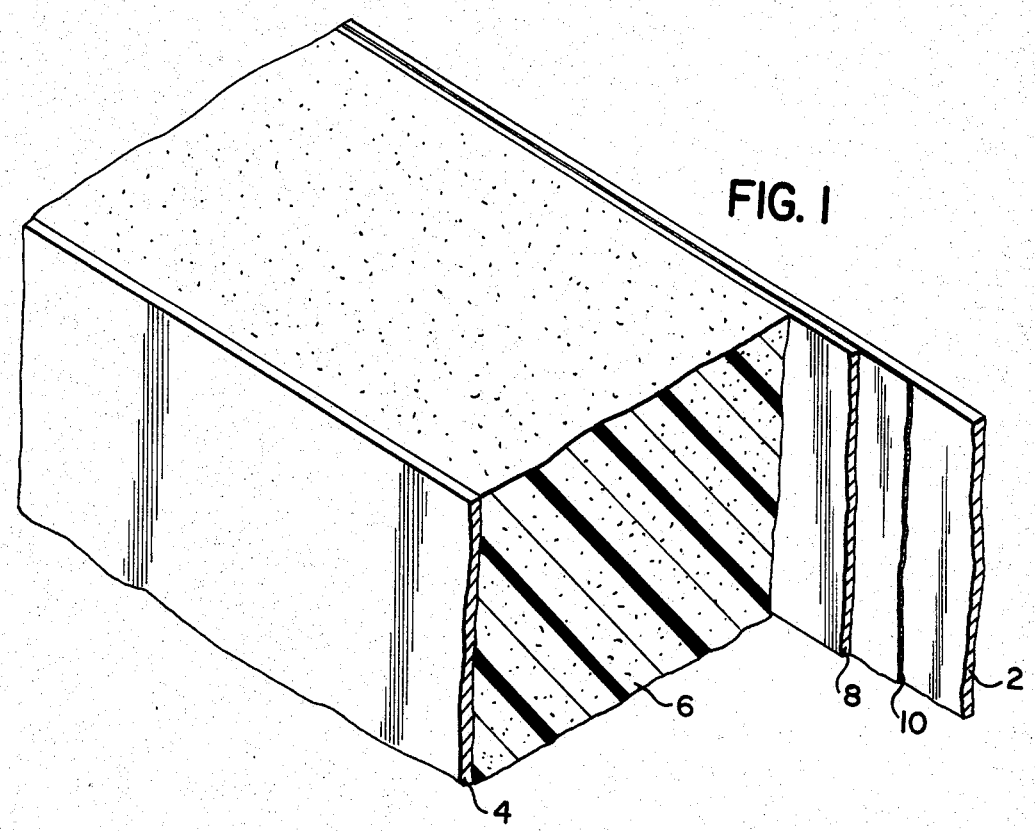
FIG. 1 is an end elevational view partially in section of my foam insulated building panel.
Figure 2:
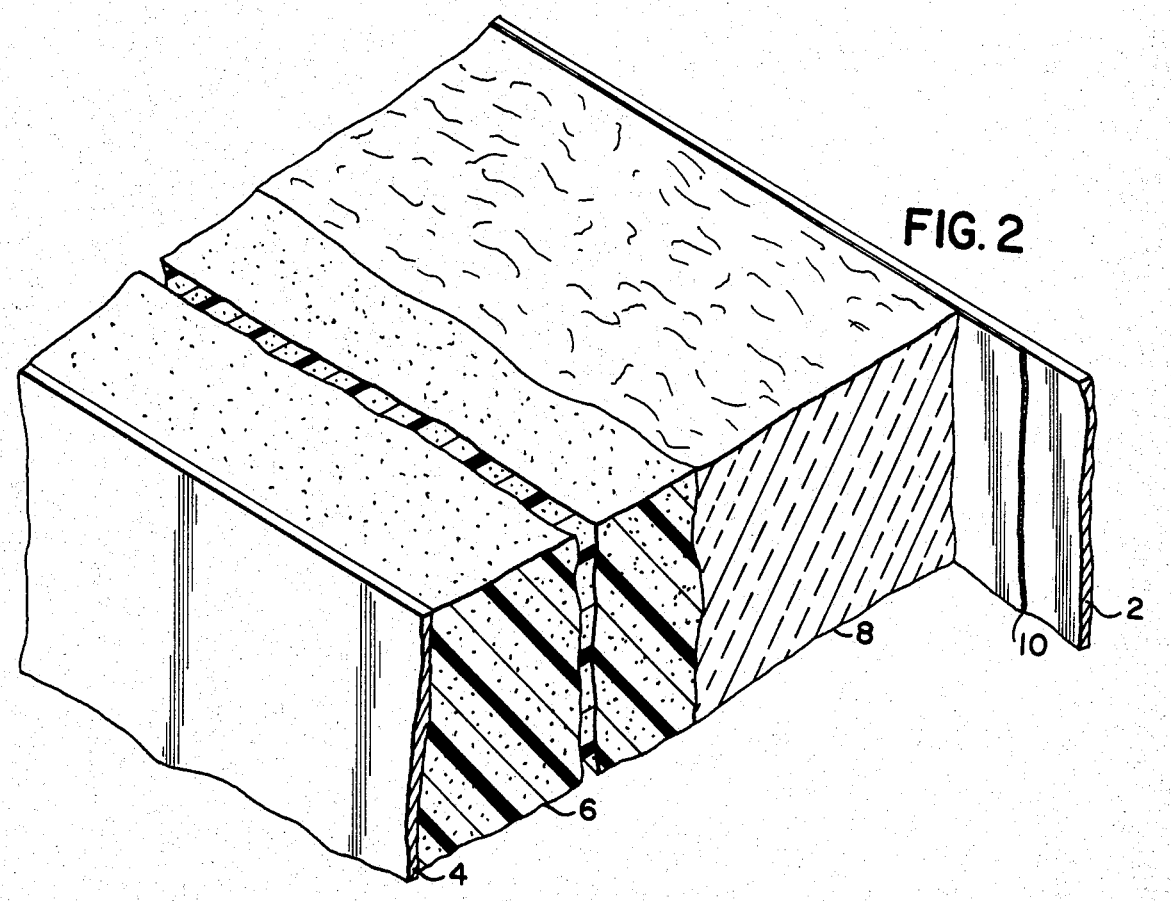
FIG. 2 is an end elevational view of a portion of a present preferred embodiment of the panel after having had one side subjected to fire.

When a fire occurs near the surface of the foamed panel the fire resistant coating expands to create a carbonaceous insulating foam barrier on the inside of the panel as illustrated in FIG. 2. A fire near skin 2 causes the solid reactive organic ingredients in the film to react and evolve gases. Most of the gases do not escape but are trapped in the film causing it to expand to up to one hundred times its original thickness. Thoses gases which do escape are nonflammable or, in the case of chlorine or bromine, actually operate as fire suppressors. As the fire resistant coating expands it pushes skin 2 away from skin 4, expanding the thickness of the panel and compressing the foam core. If the ends of the skin are retained the expanding film will cause the skin to bulge or buckle. The expanded film 8 will typically be over an inch thick. Thus, a standard size two inch thick foam insulated building panel made in accordance with the invention will increase over fifty percent in thickness. The expanded film 8 acts as an insulator protecting the core from igniting and therefore preventing smoke generation.

Tests confirm that my foam insulated building panel produces very low smoke and reduced flame spread. Two inch thick panels having a 10 mil (dry) fire resistant coating on the inside surface of the interior skin were tested in an ASTM E-84 Tunnel along with control panels to which no fire resistant coating was applied. The following data was obtained:

| Test Panel | Flame Spread* | Smoke |
|---|---|---|
| #1 Coated | 9.7 | 110.7 |
| #2 Coated | 15.1 | 101.2 |
| #3 Coated | 13.3 | 32.8 |
| #4 Control | 20.6 | 389.0 |
| #5 Control | 18.4 | 230.0 |

In addition, the following amounts of uncharred, unaffected foam remained after the flame exposed skin was removed at the end of each test:

| Location | Coated Panels | Control Panels |
|---|---|---|
| At fire point | ½ inch | 0 |
| 8' from fire point | 1 inch | 0 |
| 16' from fire point | 2 inches | 1 inch |

I have also found that the flame spread and smoke production in polyurethane foamed panels do not depend upon the foam system employed to produce the core.

While I have shown and described a present preferred embodiment of the invention it is to be distinctly understood that the invention is not limited thereto, but may be otherwise variously embodied within the scope of the following claims.

I claim:

1. A fire resistant foam insulated building panel comprising:
   a. a rigid first skin having an interior face and an exterior face,
   b. a rigid second skin having an interior face and an exterior face positioned so that the interior face of the first skin is opposite and substantially parallel to the interior face of the second skin,
   c. a thin fire resistant coating applied to the interior face of the first skin said coating comprised of a film-forming organic polymer having solid reactive ingredients distributed therethrough which when exposed to heat produce nonflammable gases which are trapped by the film-forming organic polymer thereby expanding the thickness of the fire resistant coating several times it original thickness; and
   d. a cellular plastic core between the interior faces of the first and second skins and abutting the interior face of the second skin and the fire resistant coating on the interior face of the first skin.

2. The foamed panel of claim 1 also comprising a thin fire resistant coating applied to the interior face of the second skin said coating comprised of a film-forming organic polymer having solid reactive ingredients distributed therethrough which when exposed to heat produce nonflammable gases which are trapped by the film-forming organic polymer thereby expanding the thickness of fire resistant coating.

3. The panel of claim 1 wherein the solid reactive ingredients includes a carbon source, a chlorine source, a nitrogenous compound and a polyphosphate.

4. The panel of claim 3 wherein the carbon source is dipentaerythirtol, the chlorine source is a chlorinated aliphatic hydrocarbon, the nitrogenous compound is melamine and the polyphosphate is ammonium polyphosphate.

5. The panel of claim 1 wherein the solid reactive ingredients include a carbon source, a brominated organic compound, a nitrogenous compound and a phosphate.

6. The panel of claim 1 also comprising a primer coating applied to the exterior faces of the first and second skins, the interior face of the second skin, and the interior face of the first skin between said interior face and the fire resistant coating.

7. The panel of claim 6 wherein the primer coating is a thermoset epoxy primer.

8. The panel of claim 1 wherein the cellular plastic core is a foam selected from the group consisting of polurethane, isocyanurate, polystyrene and polyurea foams.

9. The panel of claim 1 wherein the skins are comprised of a material selected from the group consisting of steel, galvanized steel, stainless steel, and aluminum.

10. The panel of claims 1 or 2 also comprising an intumescent coating applied to the exterior surface of at least one skin.

11. The panel of claim 2 also comprising a primer coating applied to the exterior faces of the first and second skins and the interior faces of the first and second skin between each interior face and the fire resistant coating applied thereon.

12. The panel of claim 1 wherein the fire resistant coating has a thickness in the range of 7 to 10 mils.

* * * * *

UNITED STATES PATENT AND TRADEMARK OFFICE
CERTIFICATE OF CORRECTION

PATENT NO. : 4,530,877

DATED : July 23, 1985

INVENTOR(S) : JOHN F. HADLEY

It is certified that error appears in the above-identified patent and that said Letters Patent is hereby corrected as shown below:

[56] Under "OTHER PUBLICATIONS", after Therm-A-Frame Brochure, Cyclops, E. G. Smith Div., pp. 1-5, add --(no date)--.

Column 1, line 9, change "polurethane" to --polyurethane--.

Column 3, line 42, change "Thoses" to --Those--.

Column 4, after the chart which begins at Column 3, line 65 and ends at line 5 of column 4, the explanation of the asterisk which appears in the heading "Flame Spread*" should be added. --*This numerical flame spread rating is not intended to reflect hazards presented by this or any other material under actual fire conditions.--

Claim 3, line 58, change "includes" to --include--.

Claim 8, line 13, change "polurethane" to --polyurethane--.

Signed and Sealed this

Twenty-first Day of January 1986

[SEAL]

Attest:

DONALD J. QUIGG

Attesting Officer

Commissioner of Patents and Trademarks